(12) United States Patent
Duncan et al.

(10) Patent No.: US 9,424,227 B2
(45) Date of Patent: Aug. 23, 2016

(54) PROVIDING BYTE ENABLES FOR PEER-TO-PEER DATA TRANSFER WITHIN A COMPUTING ENVIRONMENT

(75) Inventors: Samuel H. Duncan, Arlington, MA (US); Dennis K. Ma, Austin, TX (US); Wei-Je Huang, Fremont, CA (US); Gary Ward, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 821 days.

(21) Appl. No.: 13/541,633

(22) Filed: Jul. 3, 2012

(65) Prior Publication Data

US 2014/0012904 A1 Jan. 9, 2014

(51) Int. Cl.
| | | |
|---|---|---|
| G06F 15/173 | (2006.01) | |
| G06F 15/167 | (2006.01) | |
| G06F 15/16 | (2006.01) | |
| G06F 15/163 | (2006.01) | |
| G06F 15/17 | (2006.01) | |

(52) U.S. Cl.
CPC ............. *G06F 15/167* (2013.01); *G06F 15/16* (2013.01); *G06F 15/163* (2013.01); *G06F 15/17* (2013.01); *G06F 15/173* (2013.01)

(58) Field of Classification Search
CPC ..... G06F 15/17; G06F 15/167; G06F 15/163; G06F 15/16
USPC ........................................................ 710/30
See application file for complete search history.

(56) References Cited

U.S. PATENT DOCUMENTS

| | | | |
|---|---|---|---|
| 6,622,191 B1 * | 9/2003 | Nakamura | 710/260 |
| 7,469,309 B1 * | 12/2008 | Duncan et al. | 710/240 |
| 2009/0119464 A1 * | 5/2009 | Grundy et al. | 711/154 |
| 2011/0075473 A1 * | 3/2011 | Park et al. | 365/163 |
| 2012/0017014 A1 * | 1/2012 | Shuholm et al. | 710/65 |

\* cited by examiner

*Primary Examiner* — Henry Tsai
*Assistant Examiner* — John Roche
(74) *Attorney, Agent, or Firm* — Artegis Law Group, LLP

(57) ABSTRACT

Non-contiguous or tiled payload data are efficiently transferred between peers over a fabric. Specifically, a client transfers a byte enable message to a peer device via a mailbox mechanism, where the byte enable message specifies which bytes of the payload data being transferred via the data packet are to be written to the frame buffer on the peer device and which bytes are not to be written. The client transfers the non-contiguous or tiled payload payload data to the peer device. Upon receiving the payload data, the peer device writes bytes from the payload data into the target frame buffer for only those bytes enabled via the byte enable message. One advantage of the present invention is that non-contiguous or tiled data are transferred over a fabric with improved efficiency.

23 Claims, 8 Drawing Sheets

PROVIDING BYTE ENABLES FOR PEER-TO-PEER DATA TRANSFER WITHIN A COMPUTING ENVIRONMENT

BACKGROUND OF THE INVENTION

1. Field of the Invention

The present invention generally relates to data transfer within a computing environment and, more particularly, to providing byte enables for peer-to-peer data transfer within such a computing environment.

2. Description of the Related Art

In modern computing environments, a multitude of devices are generally interconnected to provide processing speed and flexibility within the computing environment. To create such a computing environment, various devices are connected to one another via an interconnectivity fabric such as a network or bus structure. The devices connected to the interconnectivity fabric generally include local memory that is used by a device during a computation.

One example of such a computing environment is used for graphics processing, where a plurality of graphics processing units (GPUs) are connected to one another by an interconnectivity fabric and each GPU is coupled to a frame buffer (i.e., local memory). The frame buffer stores graphics data being processed by the individual GPUs. Generally, large amounts of data need to be processed by the GPUs to render textures and create other graphics information for display. To achieve rapid processing, the processing task is divided amongst GPUs such that components of the task are performed in parallel.

At times, in such a computing environment, the graphics processing units may need to utilize information that is stored in the frame buffer of a peer GPU or may be need to write information to a frame buffer of a peer GPU such that the peer GPU may locally utilize that information. In some cases, such data are stored in a non-contiguous or tiled fashion, where particular data of interest are dispersed throughout a region of the frame buffer. Consequently, the GPU may need to read or write certain memory locations within a range of the frame buffer of a peer GPU, while leaving other memory locations in the same range untouched. Presently, implementations of many interconnectivity fabric standards such as AGP, PCI, PCI-Express™, advance switching and the like enable peers to exchange information stored in another peer's address space, but have limited capability to read or write non-contiguous or tiled data. For example, PCI-Express allows data transfers to specify that only certain bytes within the first four-byte group and last four-byte group of a data packet are written or read. In contrast, all other four-byte groups in the data-packet are transferred in full, without the ability to identify specific bytes to write or read.

Consequently, the graphics processing units limit data packets to two four-byte groups, where data transfers are directed to non-contiguous or tiled data. One problem with this approach is that many interconnectivity fabric standards define a substantial amount of overhead data (header data) that is transferred along with the data of interest (payload data) in order to complete the data transfer. Where payload data is limited to two four-byte groups per transfer, the header data may be a substantial amount of the total data transfer, reducing the percentage of the data packet devoted to payload data. As a result, payload data is transferred across the interconnect fabric with reduced efficiency. Data transfers including non-contiguous or tiled data, thereby, take longer to complete than data transfers including contiguous data.

As the foregoing illustrates, what is needed in the art is an improved technique to provide byte enables for peer-to-peer data transfer within a computing environment.

SUMMARY OF THE INVENTION

One embodiment of the present invention sets forth a method for performing peer-to-peer data transfer. The method includes creating a write command comprising a plurality of data words using a protocol that can be communicated from a first device to a second device via an interconnectivity fabric; sending the write command from the first device to the second device through the interconnectivity fabric; and creating a data word enable command comprising a plurality of data word enables using a protocol that can be communicated from a first device to a second device via the interconnectivity fabric, where each data word corresponds to a different data word enable. Such data transfer can be performed even when the communication protocol of the interconnectivity fabric does not permit such transfers.

Other embodiments include, without limitation, a subsystem that includes a first device configured to implement one or more aspects of the disclosed methods as well as a system configured to implement one or more aspects of the disclosed methods.

One advantage of the present invention is that non-contiguous or tiled data are transferred over an interconnectivity fabric with improved efficiency. The ratio of header data to payload data is reduced as compared with fabric implementations that allow byte enables for only the first or last group of bytes in the payload data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
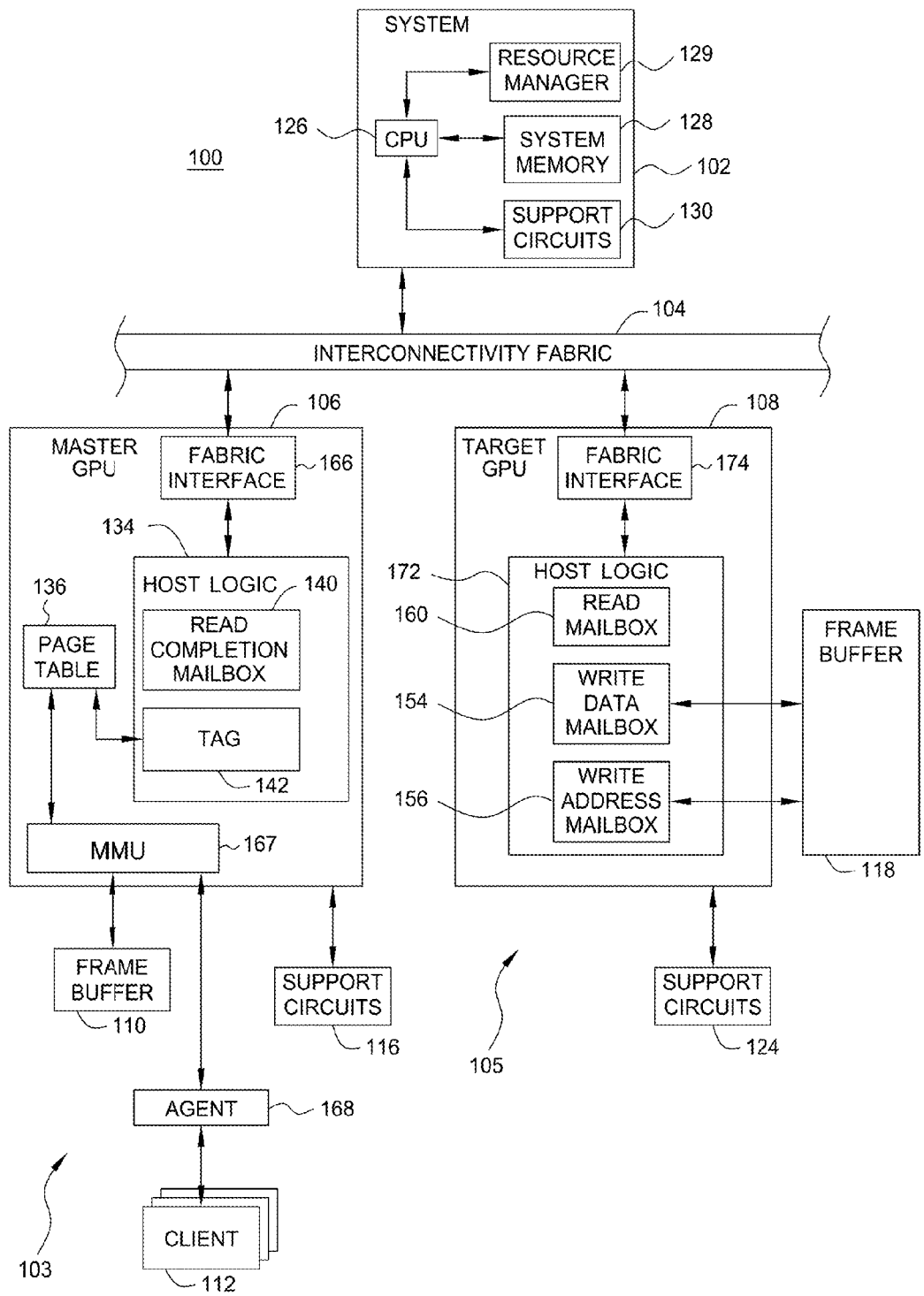
FIG. 1 illustrates a computing environment configured to implement one or more aspects of the present invention.

FIG. 1 illustrates a computing environment configured to implement one or more aspects of the present invention. As shown, the computing environment 100 includes a system level computer 102, an interconnectivity fabric 104 and a plurality of peer devices 103 and 105. The peer devices 103 and 105, although they may be any form of computing device including computer systems, network appliances, storage devices, integrated circuits, central processing units (CPUs), microcontrollers, and the like, in the embodiment depicted in FIG. 1 the peer devices 103 and 105 comprise graphics processing units (GPUs) 106 and 108. Although two devices 103 and 105 are depicted, those skilled in the art will understand that the invention is applicable to any number of peer devices. As described below, the invention provides a method and apparatus that facilitates data transfer between the peer devices 103 and 105.

The system computer 102 is a general processing computer system that includes a central processing unit (CPU) 126, system memory 128, a resource manager 129, and support circuits 130. In one embodiment of the invention, this system computer includes the "motherboard" of a computer or server. The system computer 102 uses the peer devices 103 and 105 to provide specific types of computing (such as graphics processing). The CPU 126 may be one of any form of general purpose microprocessor or microcontroller. System memory 128 comprises random access memory, read only memory, removable storage, disk drive storage, or any combination of memory devices. The resource manager 129 allocates address space to devices, such as peer devices 103 and 105 within computing environment 100 and generates a memory map for the system memory 128. The support circuits 130 are well known circuits used to facilitate functionality of the computer system 102 including clock circuits, cache, power supplies, interface circuitry and the like.

The interconnectivity fabric 104 (hereinafter simply referred to as the "fabric") comprises one of many forms of structures that enable data to be transferred from one peer device to another peer device or from one peer device to system memory. Such fabric includes an advance switching network or a bridge device supporting accelerated graphics port (AGP), peripheral controller interface (PCI) bus, or PCI-Express™ (PCIe) bus protocols or any other form of structure interconnectivity that may be used to interconnect peer devices 103 and 105. An example of interconnectivity fabric 104 known in the art is the Intel® Northbridge. In at least one embodiment, the peer devices 103 and 105 are included within a system on a chip (SoC), where the peer devices 103 and 105 communicate through a fabric configured to support such an SoC implementation, including, without limitation, advanced microcontroller bus architecture (AMBA).

Although, in FIG. 1, peer device 103 differs from peer device 105, in some embodiments of the present invention, the logic and software of each peer device 103 and 105 may be identical. The peer device 103 includes a master GPU 106 coupled to a frame buffer 110, agent 168, and support circuits 116. As shown, the master GPU 106 includes a MMU (memory management unit) 167, fabric interface 166, page table 136, and host logic 134. The fabric interface 166 couples host logic 134 to the fabric 104. The host logic 134 includes a read completion mailbox 140 and a tag 142. The frame buffer 110 is typically some form of random access memory having a very large capacity. The memory management unit 167 couples the frame buffer 110 and an agent 168 to other units within master GPU 106. The agent 168 interfaces between the master GPU 106 and one or more clients 112 (such as, processes or hardware within the computing environment). The support circuits 116 include well known circuits that facilitate the functionality of the master GPU 106 including, without limitation, clock circuits, interface hardware, and power supplies.

The peer device 105 includes a target GPU 108 coupled to a frame buffer 118 and support circuits 124. The frame buffer 118 is typically some form of random access memory having a very large capacity. Within the target GPU 108 is a fabric interface 174 and host logic 172. The fabric interface 174 couples host logic 172 to the fabric 104. The host logic 172 includes a read mailbox 160, a write data mailbox 154, and a write address mailbox 156. The support circuits 124 include well known circuits that facilitate the functionality of the target GPU 108 including, without limitation, clock circuits, interface hardware, power supplies.

In operation, a data transfer process begins with one of the clients 112 requesting access to data within a frame buffer 110 or 118. The client 112 communicates to the agent 168 that is executing on the master GPU 106. The agent 168 communicates with the memory management unit 167, which determines if the request needs access to a local frame buffer, such as frame buffer 110, or if the request needs access to a peer frame buffer, such as frame buffer 118.

In a computer environment that allows the client 112 to access data within a peer frame buffer 118 in accordance with the present invention, the page table 136 is adapted to indicate which physical memory address in the peer frame buffer 118 is accessed for a particular virtual address corresponding to the read or write request from the client 112. The page table 136 is generated by the resource manager 129 during initialization to reflect the memory mapping, including, without limitation, local, system, and peer memory mapping. An attribute field (not shown) within the page table 136 identifies whether the data is associated with a local frame buffer 110, associated with the system memory 128, associated with a peer frame buffer 118, or not associated with a memory. As previously described above, the memory management unit 167 uses the page table 136 to determine if the read or write address for the data associated with the read or write request from the client 112 is within the peer frame buffer 118.

More specifically, information for identifying and decoding information in a local or remote frame buffer is stored in entries in the page table 136 used by the requesting peer device 103. The page table entries are maintained by resource management software and interpreted by the memory management unit 167. The physical address and data type of each page referenced in a request from the client 112 are stored by the resource manager 129 in the page table 136. This information is needed by the target peer device 105 to provide the necessary data to the requesting peer device 103. For purposes of this description, "data type" includes, without limitation, endian ordering, compression format, data structure organization, information related to how the data is specified, any information related to how the data is referenced or translated when fetched from or stored in local, system or peer address space, and any combination thereof.

Figure 2:
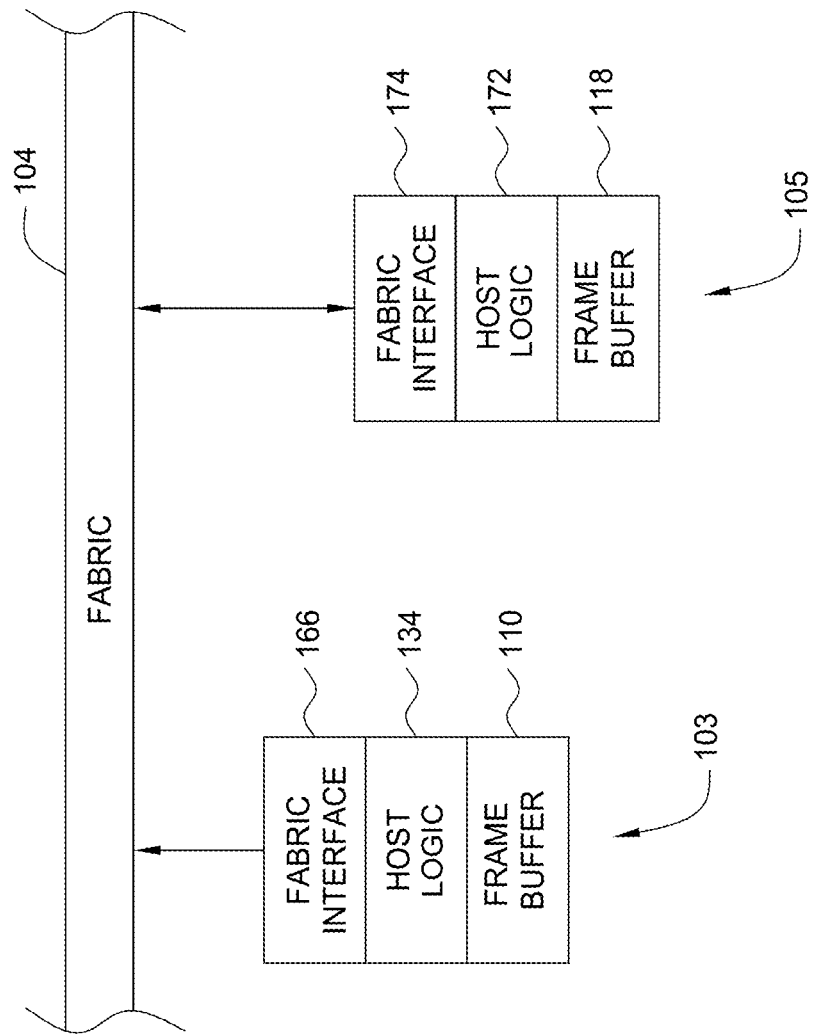
FIG. 2 depicts a functional block diagram of the computing environment of FIG. 1.

FIG. 2 depicts a functional block diagram of the computing environment of FIG. 1. Specifically, FIG. 2 depicts interconnectivity of the peer devices 103 and 105. This interconnectivity enables the peer device 103 to access (read or write) the frame buffer 118 of the peer device 105 without modification to the fabric 104 or the fabric interfaces 166, 174. As such, the fabric interfaces 166 and 174 as well as the fabric itself 104 can be any standard interconnectivity fabric and related interfaces that provide communication functionality between the peer devices 103, 105. In achieving access to the frame buffer 118 of peer device 105, the host logic 134 provides the functionality that facilitates access to the peer frame buffer 118 without alteration of the fabric interfaces 166, 174. Consequently, when a request from the client 112 of FIG. 1 for data within the peer frame buffer 118 is received by the peer device 103, the host logic 134 performs a translation of the data request into a protocol that is supported by the fabric interface 166. The fabric interface 166 transfers the request through the fabric 104 to the fabric interface 174 of the peer device 105. The host logic 172 provides functionality to access the frame buffer 118 within the remote peer device 105.

For example, if the client 112 coupled to the peer device 103 requests data from the frame buffer 118 within the peer device 105, then the host logic 134 translates that request into a form that is understandable and is readily utilized by the fabric interface 166, the fabric 104, and the fabric interface 174. As such, the request is passed from the peer device 103 to the peer device 105 and processed by the host logic 172 within the peer device 105. The host logic 172 provides access to the frame buffer 118 such that the data is either read or written, depending on the request, within the peer device 105. If the request is a read request, then the data from the frame buffer 118 is sent from the host logic 172 in such a manner that the fabric interface 174, the fabric 104 and the fabric interface 166 accept and communicate the data to the peer device 103, wherein the host logic 134 processes the data. In this manner, peer devices 103 and 105 can perform peer-to-peer data transfers without any modification to the fabric interfaces 166, 174 or the fabric 104. Consequently, peer devices that include the present invention communicate within the computing environment 100 in a standard manner using standard communication protocols.

In one specific embodiment, the fabric 104 and the fabric interfaces 166, 174 support PCI or PCI-Express™. As is well known in the art, some fabric 104 implementations using PCI and PCI-Express™ communications protocols permit only limited byte enable capability associated with a write request or a read request, where byte enables determine which bytes are written or read in response to a request and which bytes are not. Specifically, byte enables are allowed for the first four-byte group and the last four-byte group within a data packet. All other byte groups in the data packet are assumed to be enabled. The present invention overcomes this shortcoming in the standard protocol by enabling host logic 134, 172 to provide enhanced functionality resulting in the capability to specify byte enables for all bytes included in read and write data between peer devices.

The byte enables may be transmitted to the target device 105 via a separate write request where the payload data includes the byte enable data. Such a write request is discussed below.

Byte Enables

Figure 3A:
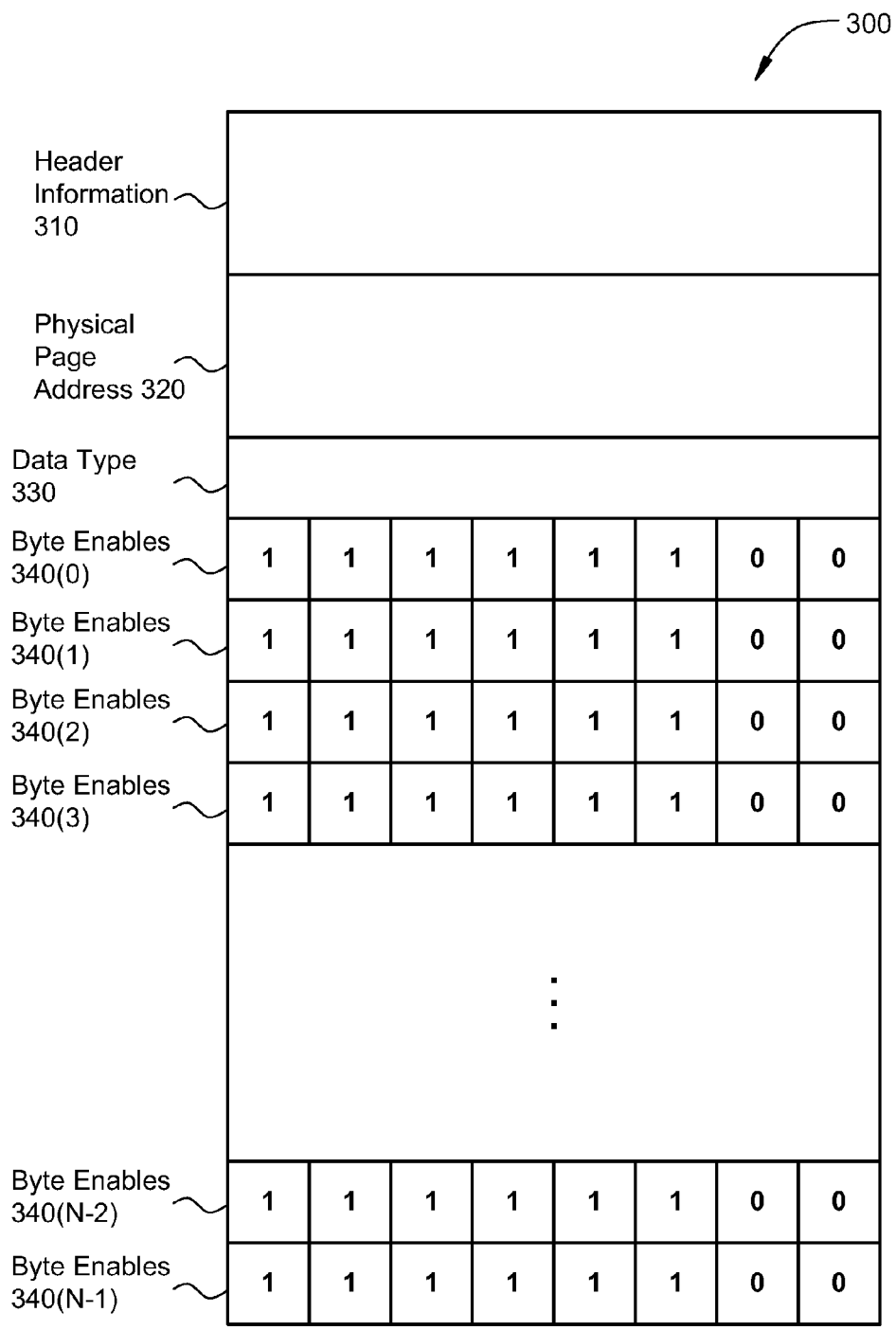
FIG. 3A depicts a write request message including byte enables transmitted from a client to a peer device, according to one embodiment of the present invention.

FIG. 3A depicts a write request message 300 including byte enables transmitted from a client to a peer device, according to one embodiment of the present invention. As shown, the write request message 300 includes header information 310, a physical page address 320, a data type 330, and byte enables 340.

The header information 310 includes various parameters related to the byte enable message other than the byte enable data itself. These parameters include, without limitation, the length of the byte enable data, the address on the target device 105 where the byte enable data is written, an identifier associated with the master device, and an identifier associated with the destination device. In general, header information ensures proper transmission and storage of the byte enable data at the target device 105. The definition and order of the various parameters are defined by the protocol associated with the fabric 104.

The physical page address 320 is the address in the peer frame buffer 118 where the payload data is written. The physical page address is needed by the target peer device 105 to ensure that the payload data transmitted in an associated message is stored in the correct locations in peer frame buffer 118. The master device updates the physical page address to update the aperture within frame buffer 118 where the payload data is written.

As previously described above, the data type 330 includes, without limitation, endian ordering, compression format, data structure organization, information related to how the data is specified, any information related to how the data is referenced or translated when fetched from or stored in local, system or peer address space, and any combination thereof. The master device updates the data type to change one or more of these parameters for associated messages that include the payload data.

The byte enables 340 indicate which bytes of the payload data are written to the target device. As shown, the write request message includes N bytes of byte enables, where each byte enable includes eight bits, corresponding to eight bytes of payload data. A byte enable bit is set to '1' to indicate that the associated byte in the payload data is written to the corresponding memory location in the target device. A byte enable bit is set to '0' to indicate that the associated byte in the payload data is not written to the corresponding memory location in the target device. Each bit in the byte enable data corresponds to a consecutive memory location in the peer frame buffer 118, starting with the memory location pointed to by the physical page address 340. In the example of FIG. 3A, byte enables 340(0) would define byte enable bits for eight bytes of payload data starting with the physical page address. Byte enables 340(0) would indicate that the first six bytes are written with payload data while the next two bytes are not. Byte enables 340(1) would define the byte enables for the next eight-byte group, indicating that the first six bytes are written with payload data while the next two bytes are not, and so on.

The quantity of byte enable bits corresponds to the quantity of bytes of payload data transmitted in an associated write request message. A write request message including such payload data is discussed below.

Figure 3B:
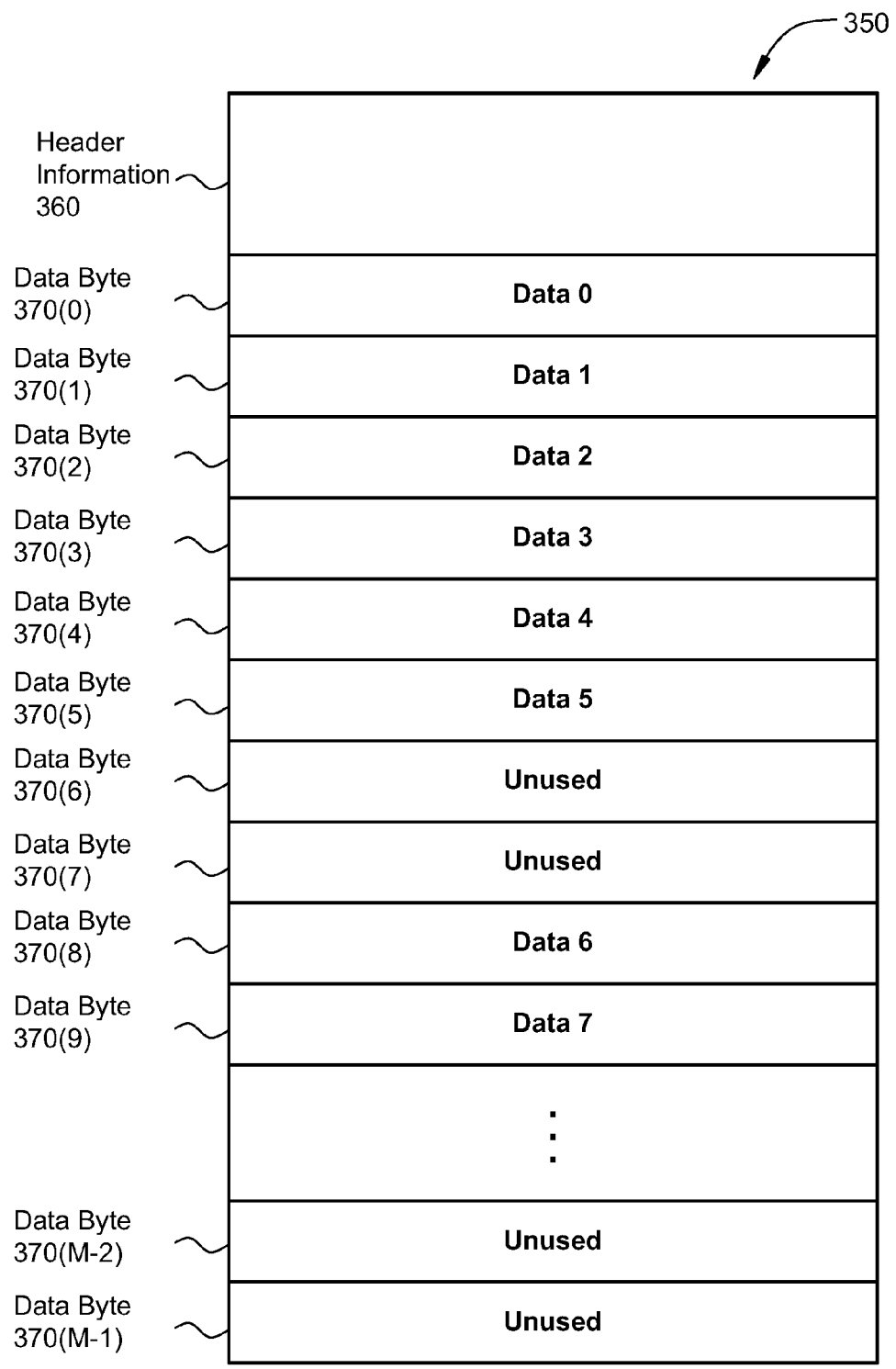
FIG. 3B depicts a write request message including payload data transmitted from a client to a peer device, according to one embodiment of the present invention.

FIG. 3B depicts a write request message 350 including payload data transmitted from a client to a peer device, according to one embodiment of the present invention. As shown, the write request message 350 includes header information 360, and data bytes 370. The header information 360 is substantially the same as the header information 310 described in conjunction with FIG. 3A, except as described below.

The header information 360 includes various parameters related to the write request message other than the payload data itself. These parameters include, without limitation, the length of the byte enable data, the address on the target device 105 where the byte enable data is written, an identifier associated with the master device, and an identifier associated with the destination device. In general, header information ensures proper transmission and storage of the byte enable data at the target device 105. The definition and order of the various parameters are defined by the protocol associated with the fabric 104.

The data bytes 370 include the payload data for the peer frame buffer 118. The write request message includes M data bytes 370, where each data byte 370 has a corresponding byte enable bit as discussed above in conjunction with FIG. 3A. For example, byte enables 340(0) would correspond to data bytes 370(0)-370(7). The first two bits of byte enables 340(1) would correspond to data bytes 370(8)-370(9). The last two bits of byte enables 340(N-1) would correspond to data bytes 370(M-2)-370(M-1).

In the example of FIG. 3B, the first six data bytes 370(0)-370(5) would include six bytes of payload data. Referring to FIG. 3A, byte enables 340(0) would indicate that these first six bytes are written to corresponding locations in the peer frame buffer 118 with these six bytes of payload data. The next two bits of byte enables 340(0) would indicate that the next two bytes of payload data are not written to the peer frame buffer 118. Correspondingly, data byte 370(6) and 370(7) of FIG. 3B are unused. The first two bits of byte enables 340(1) would indicate that the next two bytes of payload data 370(8)-370(9) are written into peer frame buffer 118. The last two bits of byte enables 340(N-1) would indicate that the last two bytes of payload data 370(8)-370(9) are not written into peer frame buffer 118.

In one embodiment, each write request message 350 including payload data may include 128 bytes of payload data, where a byte of payload data may include eight bits. As such, each write request message 300 including byte enables may include 128-bits of byte enables, where each byte enable bit may correspond to one of the 128 bytes of payload data. The 128 byte enable bits may be organized as sixteen bytes, where each byte includes eight byte enable bits.

Once the target device 105 receives the write request message include the byte enables and the write request message including the payload data, the target device 105 writes the appropriate data bytes into the region of memory starting at the memory location pointed to by the physical page address 320.

Figure 3C:
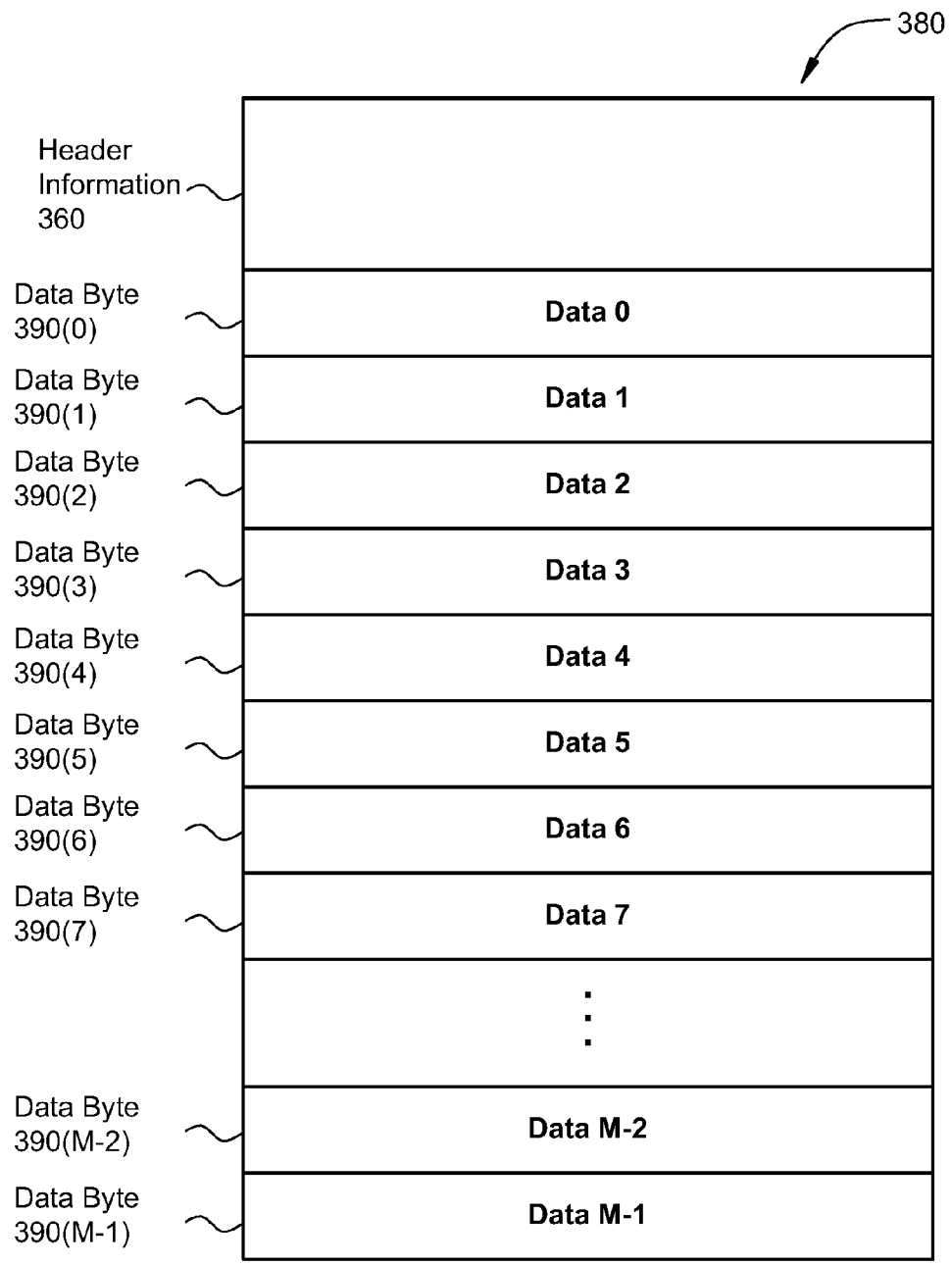
FIG. 3C depicts a write request message including payload data transmitted from a client to a peer device, according to another embodiment of the present invention.

FIG. 3C depicts a write request message 380 including payload data transmitted from a client to a peer device, according to another embodiment of the present invention. As shown, the write request message 380 includes header information 360, and data bytes 390. The header information 360 is substantially the same as described in conjunction with FIG. 3B.

The data bytes 390 include the payload data for the peer frame buffer 118. The payload data includes only active data. In other words, the write request message includes M data bytes 390, where each data byte 390 has a corresponding byte enable bit that is set to '1' as discussed above in conjunction with FIG. 3A. The payload data does not include data bytes that correspond to a data byte enable that is set to '0' (shown as the "Unused" data bytes in FIG. 3B).

For example, the first six bits of byte enables 340(0) would correspond to data bytes 390(0)-390(5). The first two bits of byte enables 340(1) would correspond to data bytes 390(6)-390(7). The last fifth and sixth bits of byte enables 340(N-1) would correspond to data bytes 390(M-2)-390(M-1). Where bits of the byte enables 340 are set to '0' (such as the last two bits of byte enables 340(0) and the last two bits of 340(N-1)), no corresponding data byte appears in the write request message 380.

In the example of FIG. 3C, the first six data bytes 390(0)-390(5) would include six bytes of payload data. Referring to FIG. 3A, byte enables 340(0) would indicate that these first six bytes are written to corresponding locations in the peer frame buffer 118 with these six bytes of payload data. The next two bits of byte enables 340(0) would indicate that the next two locations in the peer frame buffer 118 are not written. The first two bits of byte enables 340(1) would indicate that the next two bytes of payload data 370(6)-370(7) are written into peer frame buffer 118. The last two bits of byte enables 340(N-1) would indicate that the last two locations in the peer frame buffer 118. As a result of including only active data in the data bytes 390, the payload data associated with the write request message 380 of FIG. 3C is reduced relative to the payload data associated with the write request message 350 of FIG. 3B. In this manner, the payload data would be compressed to include only the data bytes 390 indicated as enabled according to the byte enables 340.

Once the target device 105 receives the write request message include the byte enables and the write request message including the payload data, the target device 105 writes the appropriate data bytes into the region of memory starting at the memory location pointed to by the physical page address 320. The target device 105 uses the byte enables 340 to expand the data bytes 390 before writing the data bytes 390 to the appropriate locations in the peer frame buffer 118. Locations within the peer frame buffer that correspond to non-enabled data bytes remain unwritten.

Figure 4:
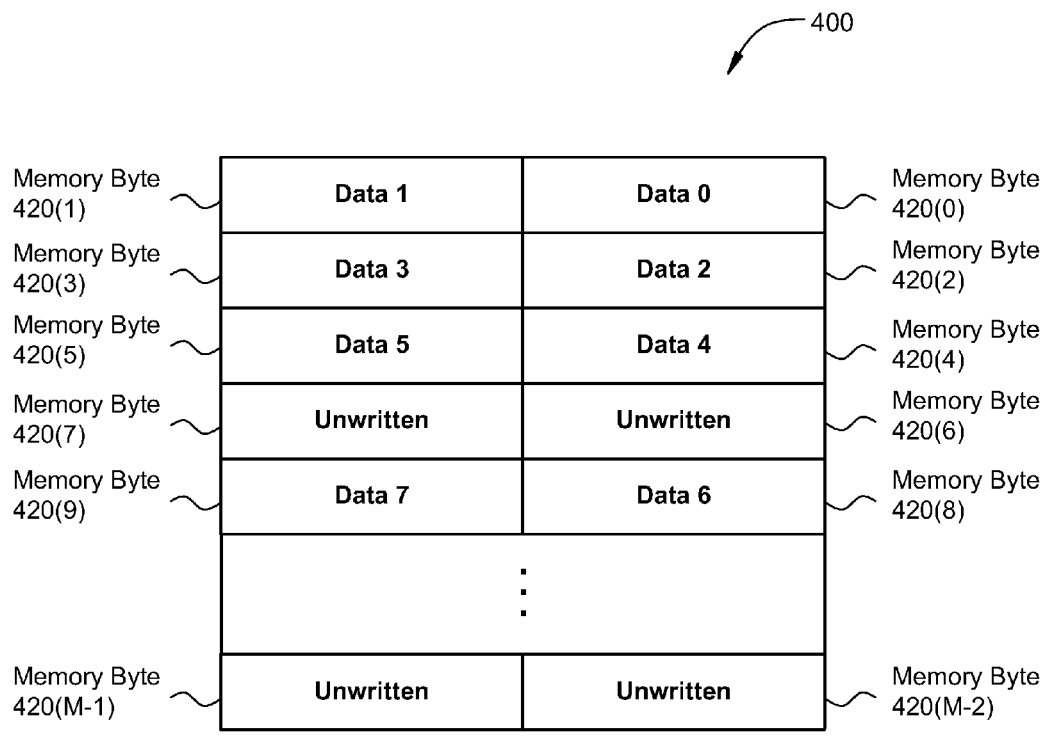
FIG. 4 depicts a region of memory in a frame buffer of a peer device, according to one embodiment of the present invention.

FIG. 4 depicts a region of memory in a frame buffer 118 of a peer device, according to one embodiment of the present invention. As shown, the region of memory includes a plurality of memory bytes 420.

The memory bytes 420 include memory locations within a region of memory starting at the physical page address 320 and extending for the number of data bytes 370 included in the payload data. Such a region of memory may be called an aperture, where the memory locations within the aperture may be written via a write request message. During the processing of a write request message, memory bytes 420 are written with payload data bytes 370, where the corresponding byte enable bit indicates that the payload data byte 370 is enabled. Memory locations 370 remain unwritten where the corresponding byte enable bit indicates that the payload data byte 370 is not enabled.

In one example, memory bytes 420(0)-420(7) would correspond to the first eight data bytes 370(0)-370(7) of the payload data of FIG. 3B. The first six memory bytes 420(0)-420(5) would be written with the first six data bytes 370(0)-370(5) of payload data. Referring to FIG. 3A, byte enables 340(0) would indicate that these first six bytes are written with these six bytes of payload data. The next two bits of byte enables 340(0) would indicate that the next two bytes of payload data are not written to the peer frame buffer 118. Correspondingly, memory bytes 420(6)-420(7) remain unwritten and the target device 105 ignores the corresponding data bytes 370(6) and 370(7) of payload data. The first two bits of byte enables 340(1) would indicate that the next two data bytes 370(8)-370(9) of payload data are written into peer frame buffer 118. The target device 105 would write the next two data bytes 370(8)-370(9) of payload data into memory bytes 420(8)-420(9). The last two bits of byte enables 340(N-1) would indicate that the last two bytes memory bytes 420(M-2)-420(M-1) remain unwritten, and the target device 105 ignores the corresponding data bytes 370(M-2)-370(M-1) of payload data.

In another example, memory bytes 420(0)-420(5) would correspond to the first six data bytes 390(0)-390(5) of the payload data of FIG. 3C. The first six memory bytes 420(0)-420(5) would be written with the first six data bytes 390(0)-390(5) of payload data. Referring to FIG. 3A, byte enables 340(0) would indicate that these first six bytes are written with these six bytes of payload data. The next two bits of byte enables 340(0) would indicate that the next two bytes of the peer frame buffer 118 remain unwritten. Correspondingly, no data bytes appear in the payload data for these two memory locations, and memory bytes 420(6)-420(7) remain unwritten. The first two bits of byte enables 340(1) would indicate that the next two data bytes 390(6)-390(7) of payload data are written into peer frame buffer 118. The target device 105 would write the next two data bytes 390(6)-390(7) of payload data into memory bytes 420(8)-420(9). The last two bits of byte enables 340(N-1) would indicate that no data bytes appear in the payload data for these two memory locations, and that the last two bytes memory bytes 420(M-2)-420(M-1) remain unwritten.

It will be appreciated that the architecture described herein is illustrative only and that variations and modifications are possible. For example, although the techniques described herein are within the context of a master device 103 initiating a write request to a target device 105, the master device 103 could also utilize these techniques for other operations, including, without limitation, read access requests and read completion requests. In another example, the write request 300 including byte enables could either precede or follow the write request 350 including the payload data. Where the byte enables follow the payload data, synchronization techniques known in the art could be employed such that the target device 105 defers processing the write request 350 including payload data until the byte enables are subsequently received.

In another example, a write request 300 including byte enables would not always be transmitted for each write request 350 including payload data. If the byte enable pattern for a subsequent packet of payload data is the same as for the last packet of payload data, then the payload data could be sent without corresponding byte enables. In such a case, the master device 103 and the target device 105 could each include a data structure that includes a byte enable pattern to store a copy of the most recently transmitted write request message 300 including byte enables. The target device 105 would process the subsequent payload data using the byte enables received in association with the previous payload data, as stored in the data structure. In yet another example, the master device 103 and the target device 105 could initialize the byte enable pattern in the above mentioned data structures such that all bytes of payload data would be enabled for writing. The byte enable pattern could be initialized in response to a predetermined condition, including, without limitation, a power-on condition or a system reset. In such a case, no byte enables are transmitted to the target device unless and until the master device 103 transmits payload data including non-contiguous or tiled data. So long as payload data is transmitted where all payload data bytes are enabled, no write requests including byte enables would be transmitted to the target device. In yet another example, although the byte enables and payload data described herein are organized in eight-bit groups or bytes, the described techniques could utilize interconnectivity fabrics that specify a data word comprising any arbitrary number of binary digits or bits. In such a system, each word of payload data could include any arbitrary number of bits, corresponding to the specification of the interconnectivity fabric. Each word of enable bits could include any arbitrary number of enable bits, also corresponding to the specification of the interconnectivity fabric.

In yet another example, a write request 350 including payload data could be split into two more write requests. Payload data could include a quantity of contiguous bytes that are not enabled. When the quantity of contiguous non-enabled bytes of payload data exceeds a predetermined amount, the payload data could be more efficiently transmitted as two write requests. In such a case, the first write request would include the payload data that precedes the contiguous non-enabled bytes of payload data. The second write request would include the payload data that follows the contiguous non-enabled bytes of payload data. The block of contiguous non-enabled bytes of payload data would not be transmitted. If the first write request or the second write request includes bytes of non-enabled data, then a write request 300 including byte enables would be created and transmitted for the first write request or the second write request as needed.

Figure 5A:
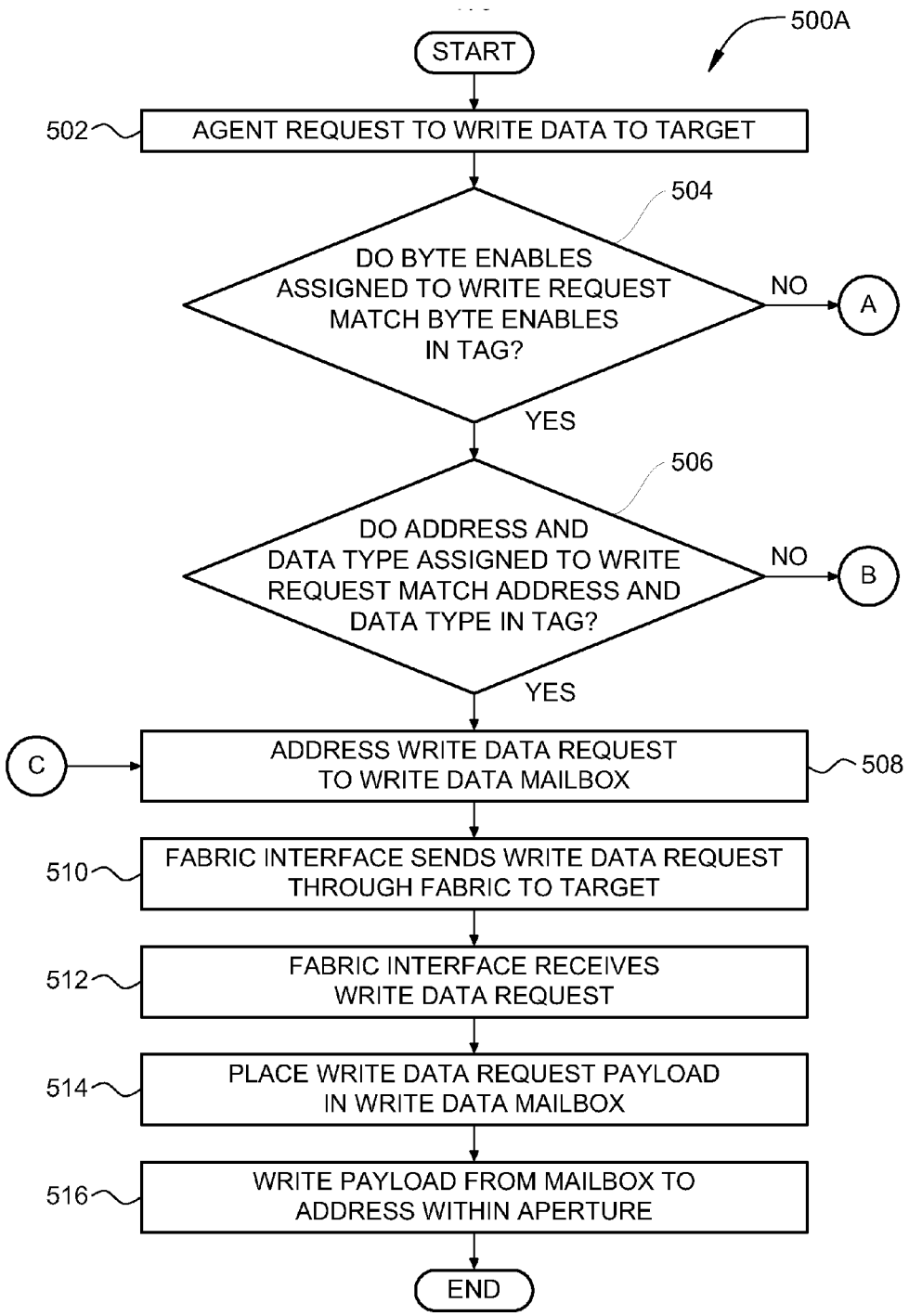
FIGS. 5A and 5B set forth a flow diagram of method steps depicting a write process including non-contiguous or tiled data performed by a client, according to one embodiment of the present invention.
Figure 5B:
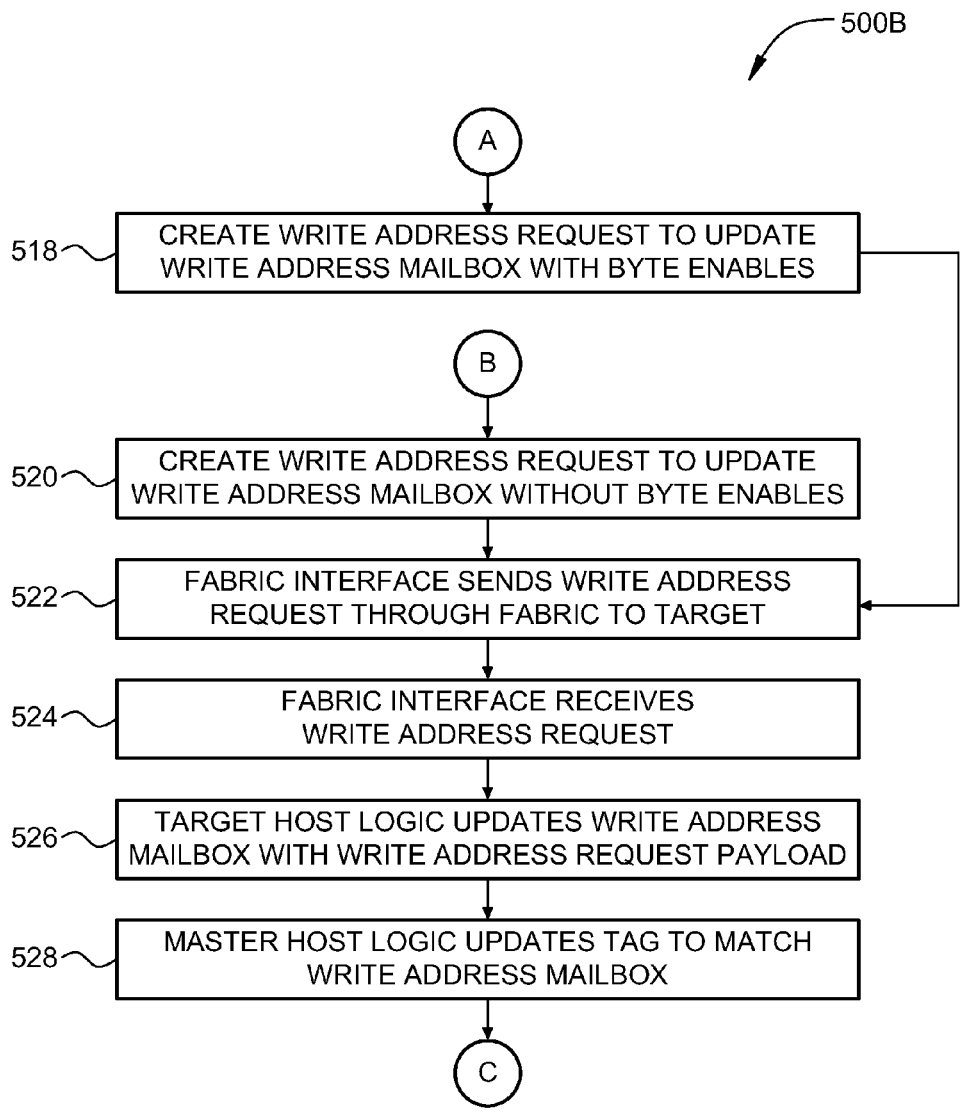

FIGS. 5A and 5B set forth a flow diagram of method steps depicting a write process including non-contiguous or tiled data performed by a client, according to one embodiment of the present invention. Although the method steps are described in conjunction with FIGS. 1-3, persons skilled in the art will understand that any system configured to perform the method steps, in any order, falls within the scope of the present invention.

As shown, the method 500 begins at step 502 and, where the agent 168, in response to a request from a client 112, requests to write data to frame buffer 118. At step 504, the host logic 134 compares a byte enable table associated with the client 112 write request in the page table 136 to the byte enable table stored in the tag 142 that resides in the master device 103.

As is further described herein, the byte enable table listed in the tag 142 corresponds to the byte enable table of the last write request output to the target device 105 from the master device 103. Therefore, the byte enable table in tag 142 always matches the byte enable table stored in the write address mailbox 156 within the host logic 172 of the target device 105. When the byte enable table in tag 142 matches the byte enable table of the write request, the byte enable table need not be transmitted to the target device 105 prior to transmitting the payload data.

If, at step 504, the byte enable table assigned to the client 112 write request does not match the byte enable table listed in the tag 142, then the method 500 proceeds to step 518, where the host logic 134 in the master device 103 creates a write address request to update the physical page address, data type, and byte enables listed in the write address mailbox 156. The purpose of this step is to ensure that only the bytes enabled by the write request are overwritten with new payload data when the payload data is written to frame buffer 118. At step 522, the fabric interface 166 of the master device 103 sends the write address request that includes the physical page address and data type assigned to the client 112 write request through the fabric 104 to the target device 105.

At step 524, the fabric interface 174 of the target device 105 receives the write address request and, at step 526, the target host logic 172 updates the write address mailbox 156 with the physical page address and data type included in the payload of the write address request created in step 518. When the physical page address stored in the write address mailbox 156 is changed, the aperture is moved, that is, positioned at a different memory page within the peer frame buffer 118. The target host logic 172 also updates the write address mailbox 156 with the byte enable table included in the payload of the write address request created in step 518. At step 528, the host logic 134 updates the tag 142 to match the physical page address, data type, and byte enable table in write address mailbox 156. At this point the aperture into the peer frame buffer 118 is correctly aligned for the client 112 write request.

The method 500 then proceeds to step 508, where the host logic 134 addresses a write data request to the write data mailbox 154 that resides in the target device 105. The payload of the write data request may be all or part of the data included in the client 112 write request. At step 510, the fabric interface 166 sends the write data request through the fabric 104 to the target device 105. At step 512, the fabric interface 174 of the target device 105 receives the write data request. At step 514, the host logic 172 places the payload included in the write data request into the write data mailbox 154. At step 516, the payload is written from the write data mailbox 154 to an address within the aperture of the frame buffer 118 specified by the write address mailbox 156. Further, the payload is written with the format specified by the data type included in the write address mailbox 156. The method 500 then terminates.

Returning to step 504, if the byte enable table assigned to the client 112 write request does match the byte enable table listed in the tag 142, then the method 500 proceeds to step 506, where the host logic 134 compares a physical page address and data type assigned to the client 112 write request in the page table 136 to the physical page address and data type stored in the tag 142 that resides in the master device 103.

As is further described herein, the physical page address and data type listed in the tag 142 corresponds to the physical page address and data type of the last write request output to the target device 105 from the master device 103. Therefore, the physical page address and data type in tag 142 always match the physical page address and data type stored in the write address mailbox 156 within the host logic 172 of the target device 105. The physical page address stored in the write address mailbox 156 defines an aperture into the peer frame buffer 118. The aperture is a smaller region within the peer frame buffer 118. For example, the aperture may correspond to a particular memory page within the peer frame buffer 118 and the lower bits of the write request address provide an index into the aperture. The aperture may be moved by changing the physical page address in the write address mailbox 156, as described further herein. When the physical page address and data type in tag 142 match the physical page address and data type of the write request, the aperture into the peer frame buffer 118 is correctly aligned for the client 112 write request.

If, at step 506 the physical page address and data type assigned to the client 112 write request do not match the physical page address and data type listed in the tag 142, then the method 500 proceeds to step 520, where the host logic 134 in the master device 103 creates a write address request to update the physical page address and data type listed in the write address mailbox 156. In such a case, the byte enable table matches, so there is no need to update the byte enable table as part of the write address request. Rather, the purpose of this step is to establish an aperture position that matches the physical page address assigned to the client 112 write request so that the data included in the client 112 write request may be properly written into the target frame buffer 118. Generally, this aperture is sized as large as a memory page of the target frame buffer 118. Likewise, the write data mailbox 154 is sized to store a memory page of the target frame buffer 118. The method then proceeds to step 522, described above.

If, at step 506 the physical page address and data type assigned to the client 112 write request do match the physical page address and data type listed in the tag 142, then the method 500 proceeds to step 508, described above.

As described above in conjunction with FIG. 4, payload data that includes a block of contiguous bytes of non-enabled payload data could be transmitted as two separate write requests, a first write request for the payload data that precedes the block of contiguous bytes, and a second write request for the payload data that follows the block of contiguous bytes. In such a case, the steps of method 500 would be performed for each of the first write request and the second write request.

In sum, non-contiguous or tiled payload data are efficiently transferred between peers over a fabric. Specifically, a client transfers a byte enable message to a peer device via a mailbox mechanism, where the byte enable message specifies which bytes of the payload data being transferred via the data packet are to be written to the frame buffer on the peer device and which bytes are not to be written. The client transfers the non-contiguous or tiled payload payload data to the peer device. Upon receiving the payload data, the peer device writes bytes from the payload data into the target frame buffer for only those bytes enabled via the byte enable message. The peer device does not write bytes from the payload data into the target frame buffer for those bytes that are not enabled by the byte enable message.

Advantageously, non-contiguous or tiled data are transferred over a fabric with improved efficiency. The ratio of header data to payload data is reduced as compared with fabric implementations that allow byte enables for only the first or last group of bytes in the payload data. Where multiple packets of payload data use the same byte enable pattern, the byte enable message need only be transferred once.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. Therefore, the scope of embodiments of the present invention is set forth in the claims that follow.

What is claimed is:

1. A method for performing peer-to-peer data transfer comprising:
   receiving a request to write a plurality of data words from a first device to a second device;
   creating a first write command comprising at least a first portion of the plurality of data words using a protocol that can be communicated from the first device to the second device via an interconnectivity fabric;
   sending the first write command from the first device to the second device through the interconnectivity fabric; and
   creating a first data word enable command comprising a first plurality of data word enables using the protocol, wherein the first plurality of data word enables are grouped into one or more enable words, and each enable word within the one or more enable words corresponds to a different set of data words within the at least a first portion of the plurality of data words.

2. The method of claim 1, further comprising:
   sending the first data word enable command from the first device to the second device through the interconnectivity fabric,
   wherein the first data word enable command causes a first data word within the plurality of data words to be written to a local memory associated with the second device only if a first data word enable within the first plurality of data word enables indicates that the first data word is enabled.

3. The method of claim 2, wherein sending the first data word enable command precedes sending the first write command.

4. The method of claim 2, wherein the first and second devices comprise graphics processing units (GPUs), and the local memory comprises a frame buffer.

5. The method of claim 2, wherein the first device comprises a central processing unit (CPU), the second device comprises a graphics processing unit (GPU), and the local memory comprises a frame buffer.

6. The method of claim 1, further comprising:
causing a first data word enable data structure associated with the first device to be written with a first copy of the first plurality of data word enables; and
causing a second data word enable data structure associated with the second device to be written with a second copy of the first plurality of data word enables.

7. The method of claim 6, further comprising:
in response to a predetermined condition, causing the first data word enable data structure and the second data word enable data structure to be initialized to indicate that all data words are enabled.

8. The method of claim 6, further comprising:
determining that a first data word enable pattern associated with the first data word enable data structure differs from a second data word enable pattern associated with the first data word enable command; and
sending the first data word enable command from the first device to the second device through the interconnectivity fabric;
wherein the first data word enable command causes a data word within the plurality of data words to be written to a local memory associated with the second device only if a corresponding data word enable within the first plurality of data word enables indicates that the data word is enabled.

9. The method of claim 1, wherein the interconnectivity fabric comprises a bridge device that supports advanced microcontroller bus architecture (AMBA), accelerated graphics port (AGP), peripheral controller interface (PCI) bus, or PCI-Express™ (PCIe) bus protocols.

10. The method of claim 1, wherein the first device and the second device are included within a system on a chip (SoC) implementation.

11. The method of claim 1, wherein the first data word enable command is incompatible with the interconnectivity fabric when not created using the protocol.

12. The method of claim 1, wherein the first data word enable command comprises an address and a data type associated with the plurality of data words.

13. The method of claim 1, further comprising:
determining that a predetermined quantity of contiguous data words within the plurality of data words is not enabled;
creating a second write command comprising at least a second portion of the plurality of data words using a protocol that can be communicated from the first device to the second device via the interconnectivity fabric, wherein the at least a second portion of the plurality of data words follows the predetermined quantity of contiguous data words within the plurality of data words;
sending the second write command from the first device to the second device through the interconnectivity fabric; and
creating a second data word enable command comprising a second plurality of data word enables using a protocol that can be communicated from a first device to a second device via the interconnectivity fabric,
wherein each data word within the at least a second portion of the plurality of data words corresponds to a different data word enable within the second data word enable command.

14. The method of claim 13, further comprising:
sending the second data word enable command from the first device to the second device through the interconnectivity fabric,
wherein the second data word enable command causes a second data word within the plurality of data words to be written to a local memory associated with the second device only if a second data word enable within the second plurality of data word enables indicates that the second data word is enabled.

15. The method of claim 1, wherein the at least a first portion of the plurality of data words includes all data words in the plurality of data words.

16. The method of claim 1, wherein each data word within the at least a first portion of the plurality of data words is enabled to be written to a memory associated with the second device.

17. A subsystem comprising:
a first device configured to perform peer-to-peer data transfers by performing the steps of:
receiving a request to write a plurality of data words from a first device to a second device;
creating a first write command comprising at least a first portion of the plurality of data words using a protocol that can be communicated from the first device to the second device via an interconnectivity fabric;
sending the first write command from the first device to the second device through the interconnectivity fabric; and
creating a first data word enable command comprising a first plurality of data word enables using the protocol, wherein the first plurality of data word enables are grouped into one or more enable words, and each enable word within the one or more enable words corresponds to a different set of data words within the at least a first portion of the plurality of data words.

18. The subsystem of claim 17, wherein the first device is further configured to perform the steps of:
sending the first data word enable command from the first device to the second device through the interconnectivity fabric,
wherein the first data word enable command causes a first data word within the plurality of data words to be written to a local memory associated with the second device only if a first data word enable within the first plurality of data word enables indicates that the first data word is enabled.

19. The subsystem of claim 17, wherein the first device is further configured to perform the steps of:
causing a first data word enable data structure associated with the first device to be written with a first copy of the first plurality of data word enables; and
causing a second data word enable data structure associated with the second device to be written with a second copy of the first plurality of data word enables.

20. The subsystem of claim 19, wherein the first device is further configured to perform the steps of:
in response to a predetermined condition, causing the first data word enable data structure and the second data word enable data structure to be initialized to indicate that all data words are enabled.

21. The subsystem of claim 19, wherein the first device is further configured to perform the steps of:
determining that a first data word enable pattern associated with the first data word enable data structure differs from a second data word enable pattern associated with the first data word enable command; and
sending the first data word enable command from the first device to the second device through the interconnectivity fabric;

wherein the first data word enable command causes a data word within the plurality of data words to be written to a local memory associated with the second device only if a corresponding data word enable within the first plurality of data word enables indicates that the data word is enabled.

22. A system for performing peer-to-peer data transfer comprising:
   a first device;
   a second device;
   an interconnectivity fabric;
   a memory coupled to the first device, wherein the memory includes an application program that includes instructions that, when executed by the first device, cause the first device to perform the steps of:
      receiving a request to write a plurality of data words from a first device to a second device;
      creating a first write command comprising at least a first portion of the plurality of data words using a protocol that can be communicated from the first device to the second device via an interconnectivity fabric;
      sending the first write command from the first device to the second device through the interconnectivity fabric; and
      creating a first data word enable command comprising a first plurality of data word enables using the protocol, wherein the first plurality of data word enables are grouped into one or more enable words, and each enable word within the one or more enable words corresponds to a different set of data words within the at least a first portion of the plurality of data words.

23. The method of claim 1, wherein a first enable word within in the one or more enable words comprises a plurality of bits, and each bit corresponds to a different data word within the at least a first portion of the plurality of data words.

* * * * *